(12) United States Patent
Gadkaree et al.

(10) Patent No.: US 8,664,154 B2
(45) Date of Patent: *Mar. 4, 2014

(54) METHODS OF MAKING AND USING ACTIVATED CARBON-CONTAINING COATED SUBSTRATES AND THE PRODUCTS MADE THEREFROM

(71) Applicant: Corning Incorporated, Corning, NY (US)

(72) Inventors: Kishor Purushottam Gadkaree, Painted Post, NY (US); Andrew Fleitz Husted, Wellsburg, NY (US); James Robert Lim, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/923,026

(22) Filed: Jun. 20, 2013

(65) Prior Publication Data

US 2013/0281286 A1    Oct. 24, 2013

Related U.S. Application Data

(63) Continuation of application No. 12/426,486, filed on Apr. 20, 2009.

(51) Int. Cl.
*C01B 31/08* (2006.01)
*B01D 53/00* (2006.01)

(52) U.S. Cl.
USPC ............ 502/423; 502/182; 95/133; 95/134; 55/DIG. 5; 210/679

(58) Field of Classification Search
USPC ............ 95/133, 134; 210/679; 502/182, 423; 55/DIG. 5
See application file for complete search history.

(56) References Cited

U.S. PATENT DOCUMENTS

| | | | |
|---|---|---|---|
| 2,437,174 A | 3/1948 | Signaigo et al. |
| 3,149,023 A | 9/1964 | Bodendorf et al. |
| 4,130,487 A | 12/1978 | Hunter et al. |
| 4,289,513 A | 9/1981 | Brownhill et al. |
| 4,500,327 A | 2/1985 | Nishino et al. |
| 4,956,162 A | 9/1990 | Smith et al. |
| 5,037,791 A | 8/1991 | Comolli et al. |
| 5,082,167 A | 1/1992 | Sadano et al. |
| 5,158,580 A | 10/1992 | Chang |
| 5,451,444 A | 9/1995 | DeLiso et al. |
| 5,505,766 A | 4/1996 | Chang |
| 5,510,063 A | 4/1996 | Gadkaree et al. |
| 5,538,929 A | 7/1996 | Sudhakar et al. |

(Continued)

FOREIGN PATENT DOCUMENTS

| | | |
|---|---|---|
| EP | 0745416 | 12/1996 |
| EP | 1435260 | 7/2004 |

(Continued)

OTHER PUBLICATIONS

Office Action dated Apr. 3, 2013 (English Translation) for Chinese Patent Application No. 201080018141.6 (11 Pages).

(Continued)

*Primary Examiner* — Christopher P Jones
(74) *Attorney, Agent, or Firm* — Joseph M. Horna

(57) ABSTRACT

The present disclosure relates to methods of making and using activated carbon-containing coated substrates, and products made therefrom.

20 Claims, 2 Drawing Sheets

(56) References Cited

U.S. PATENT DOCUMENTS

| | | | |
|---|---|---|---|
| 5,582,865 | A | 12/1996 | Rezuke et al. |
| 5,776,385 | A | 7/1998 | Gadkaree et al. |
| 5,827,577 | A | 10/1998 | Spencer |
| 5,997,829 | A | 12/1999 | Sekine et al. |
| 6,120,584 | A | 9/2000 | Sakata et al. |
| 6,129,846 | A | 10/2000 | Gadkaree |
| 6,136,749 | A | 10/2000 | Gadkaree et al. |
| 6,187,713 | B1 | 2/2001 | Gadkaree |
| 6,258,334 | B1 | 7/2001 | Gadkaree et al. |
| 6,328,939 | B1 | 12/2001 | Amrhein |
| 6,368,726 | B1 | 4/2002 | Holpp et al. |
| 6,372,289 | B1 | 4/2002 | Hickman |
| 6,413,303 | B2 | 7/2002 | Gelderland et al. |
| 6,493,210 | B2 | 12/2002 | Nonaka et al. |
| 6,503,470 | B1 | 1/2003 | Nolan et al. |
| 6,579,507 | B2 | 6/2003 | Pahlman et al. |
| 6,610,263 | B2 | 8/2003 | Pahlman et al. |
| 6,616,905 | B1 | 9/2003 | Kawamura et al. |
| 6,656,360 | B2 | 12/2003 | Rohrbach et al. |
| 6,689,328 | B1 | 2/2004 | Otani et al. |
| 6,695,894 | B2 | 2/2004 | Chang et al. |
| 6,790,420 | B2 | 9/2004 | Breen et al. |
| 6,793,895 | B1 | 9/2004 | Wieres et al. |
| 6,911,189 | B1 | 6/2005 | Koller et al. |
| 7,048,896 | B2 | 5/2006 | Nagel et al. |
| 7,063,733 | B2 | 6/2006 | Mori et al. |
| 7,083,860 | B2 | 8/2006 | Maus et al. |
| 7,101,602 | B2 | 9/2006 | Althofer et al. |
| 7,111,393 | B2 | 9/2006 | Brock |
| 7,197,822 | B2 | 4/2007 | Voit et al. |
| 7,222,612 | B2 | 5/2007 | Hagler et al. |
| 7,278,542 | B2 | 10/2007 | Dussaud et al. |
| 7,377,963 | B2 | 5/2008 | Tanahashi et al. |
| 7,442,352 | B2 | 10/2008 | Lu et al. |
| 7,468,414 | B2 | 12/2008 | Nishida |
| 7,485,225 | B2 | 2/2009 | Krogue et al. |
| 7,722,705 | B2 | 5/2010 | Gadkaree et al. |
| 7,998,898 | B2 | 8/2011 | Gadkaree et al. |
| 2002/0170431 | A1 | 11/2002 | Chang et al. |
| 2002/0172633 | A1 | 11/2002 | Koermer et al. |
| 2004/0118287 | A1 | 6/2004 | Jaffe et al. |
| 2004/0121688 | A1 | 6/2004 | Edens et al. |
| 2004/0163540 | A1 | 8/2004 | Mori et al. |
| 2004/0202596 | A1 | 10/2004 | Honjo et al. |
| 2005/0019240 | A1 | 1/2005 | Lu et al. |
| 2005/0092675 | A1 | 5/2005 | Nakahara et al. |
| 2005/0152821 | A1 | 7/2005 | Durante et al. |
| 2005/0211099 | A1 | 9/2005 | Doughty et al. |
| 2005/0212174 | A1 | 9/2005 | Tanahashi et al. |
| 2006/0210874 | A1 | 9/2006 | Erhardt et al. |
| 2006/0231487 | A1 | 10/2006 | Bartley et al. |
| 2007/0071933 | A1 | 3/2007 | Gavelli et al. |
| 2007/0261557 | A1 | 11/2007 | Gardkaree et al. |
| 2007/0265161 | A1 | 11/2007 | Gadkaree et al. |
| 2008/0026041 | A1 | 1/2008 | Tepper et al. |
| 2008/0297980 | A1 | 12/2008 | Bourcier et al. |
| 2010/0004119 | A1 | 1/2010 | Gadkaree et al. |

FOREIGN PATENT DOCUMENTS

| | | |
|---|---|---|
| GB | 2122916 | 1/1984 |
| WO | 9925449 | 5/1999 |
| WO | 2003045532 | 6/2003 |
| WO | 2007050480 | 5/2007 |
| WO | 2007112197 | 10/2007 |
| WO | 2008143831 | 11/2008 |
| WO | 2010002444 | 1/2010 |
| WO | 2010024916 | 3/2010 |

OTHER PUBLICATIONS

International Search Report & Written Opinion for International Application No. PCT/US2010/031020, which claims priority to the present U.S. Application; mail date Dec. 14, 2010.

Notice of Allowance dated Aug. 1, filed in U.S. Appl. No. 12/426,486.

Petition to Withdraw Application From Issue Pursuant to 37 CFR 1.313(c)(2) dated Jul. 25, 2013 filed in U.S. Appl. No. 12/426,486.

Notice of Allowance and Fee(S)Due dated Apr. 18, 2013 filed in U.S. Appl. No. 12/426,486.

Supplemental Response to Office Action of Apr. 2, 2013 filed on Apr. 11, 2013 in U.S. Appl. No. 12/426,486.

Amendment and Response to Final Office Action of Nov. 5, 2012 filed on Jan. 4, 2013 in U.S. Appl. No. 12/426,486.

Final Office Action dated Nov. 5, 2012 filed in U.S. Appl. No. 12/426,486.

Amendment and Response to Final Office Action of Jun. 8, 2012 filed on Sep. 7, 2012 in U.S. Appl. No. 12/426,486.

Non-Final Office Action dated Jun. 8, 2012 filed in U.S. Appl. No. 12/426,486.

Amendment and Response to Final Office Action of Dec. 16, 2011 filed on Feb. 16, 2012 in U.S. Appl. No. 12/426,486.

Non-Final Office Action dated Dec. 16, 2011 filed in U.S. Appl. No. 12/426,486.

Amendment and Response to Office Action of Jul. 19, 2011 filed on Nov. 10, 2011 in U.S. Appl. No. 12/426,486.

Non-Final Office Action dated Jul. 19, 2011 filed in U.S. Appl. No. 12/426,486.

Amendment and Response to Office Action of Mar. 11, 2011 filed on Jun. 2, 2011 in U.S. Appl. No. 12/426,486.

Non-Final Office Action dated Mar. 11, 2011 filed in U.S. Appl. No. 12/426,486.

Notice on the Second Office Action (English Translation), dated Nov. 20, 2013, pp. 1-5, Chinese Patent Application No. 20108 Intellectual Property Office of the People's Republic of China.

METHODS OF MAKING AND USING ACTIVATED CARBON-CONTAINING COATED SUBSTRATES AND THE PRODUCTS MADE THEREFROM

CROSS REFERENCE TO RELATED APPLICATIONS

The present specification is a continuation of U.S. patent application Ser. No. 12/426,486 filed Apr. 20, 2009 and entitled "Methods Of Making And Using Activated Carbon-Containing Coated Substrates And The Products Made Therefrom".

FIELD OF THE DISCLOSURE

The present disclosure relates to methods of making and using activated carbon-containing coated substrates, and products made therefrom.

BACKGROUND

Activated carbon-containing shaped bodies, such as honeycombs, may be used as catalyst substrates or as sorbents/filters for the capture of particulate, liquid, or gaseous species from fluids, such as gas streams and liquid streams. For example, the shaped bodies may be used as sorbents for the capture of heavy metals from gas streams.

Traditionally, activated carbon-containing shaped bodies may be manufactured by first subjecting an unprocessed or "green" shaped body to one or more heat treatments, and/or then subsequently subjecting the treated shaped body to one or more controlled oxidation firings. For example, honeycomb bodies may be fabricated by extruding a synthetic resin source and then firing for carbonization and activation. The honeycomb body may optionally be impregnated with sulfur and/or a catalyst. Although these traditional methods may be satisfactory, particularly in certain embodiments, it may be advantageous to have additional methods for manufacturing activated carbon-containing shaped bodies.

The inventors have now discovered additional, novel methods for making and using activated carbon-containing coated substrates and shaped bodies, and products made therefrom.

SUMMARY

In accordance with the detailed description and various exemplary embodiments described herein, the present disclosure relates to methods of making and using activated carbon-containing coated substrates and shaped bodies, and the products made therefrom. In various embodiments, the present disclosure relates to methods of making activated carbon-containing substrates comprising applying at least one sorbent material to at least one substrate, wherein the sorbent material comprises activated carbon. Various embodiments further relate to methods wherein the coated substrate may be shaped and may further be formed into a shaped body. The disclosure further relates to activated carbon-containing shaped bodies and to using the activated carbon-containing coated substrates and shaped bodies disclosed herein to sorb at least one heavy metal from a fluid stream.

BRIEF DESCRIPTION OF THE DRAWINGS

The accompanying drawings are included to provide a further understanding of the invention, and are incorporated in and constitute a part of this specification. The drawings are not intended to be restrictive of the invention as claimed, but rather are provided to illustrate embodiments of the invention and, together with the description, serve to explain the principles of the invention.

DETAILED DESCRIPTION

Figure 1:
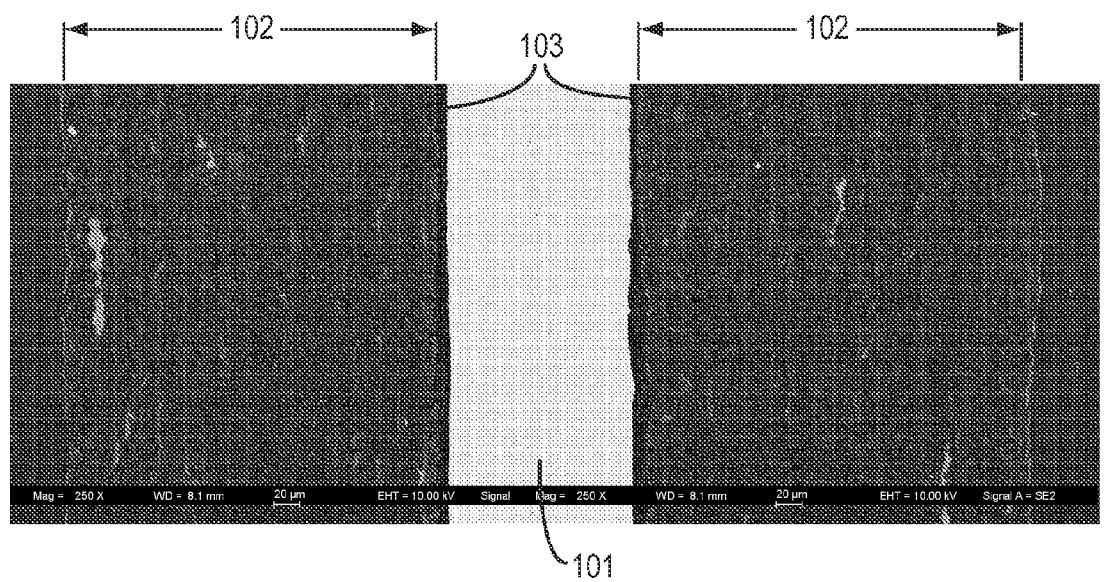
FIG. 1 is a SEM micrograph of a cross-section of an exemplary coated substrate according to one embodiment of the disclosure.

It is to be understood that both the foregoing general description and the following detailed description are exemplary and explanatory only, and are not restrictive of the invention, as claimed. Other embodiments of the invention will be apparent to those skilled in the art from consideration of the specification and practice of the invention disclosed herein.

The present disclosure relates to methods of making activated carbon-containing coated substrates and shaped bodies. In various embodiments, the methods comprise applying at least one sorbent material to at least one substrate, and may further comprise shaping the coated substrate, and may further comprise forming a shaped body.

As described herein, the at least one sorbent material comprises activated carbon. In various embodiments, the activated carbon is in the form of, for example, activated carbon powder, granular activated carbon, or a combination thereof. Exemplary activated carbon particles in at least one embodiment include those having a median particle size ranging from 1 µm to 100 µm. In a further exemplary embodiment, the activated carbon is activated carbon powder with mesopore to micropore ratio of about 0.5. In another embodiment, the activated carbon is in the form of a continuous uninterrupted structure of carbon. The continuous structure can be derived, for example, by converting a synthetic polymeric carbon-containing substance to a continuous carbon structure by carbonizing and then activating the continuous carbon structure by methods known in the art.

In various exemplary embodiments, the at least one sorbent material may further comprise: sulfur, in any oxidation state, as elemental sulfur or in a chemical compound or moiety comprising sulfur; and/or a metal catalyst, in any oxidation state, as elemental metal or in a chemical compound or moiety comprising the metal.

Sulfur may include sulfur at any oxidation state, including elemental sulfur (0), sulfate (+6), sulfite (+4), and sulfide (−2). As used herein, the term "sulfur" includes elemental sulfur or sulfur present in a chemical compound or moiety. The amount of sulfur present in the sorbent material may easily be determined by those skilled in the art, and may be chosen, for example, based upon the particular metal catalyst if present, the application for which the sorbent is used, and the desired contaminant removing capacity and efficiency of the sorbent. In some embodiments, the sorbent material may comprise from 1% to 20% by weight of sulfur, for example from 1% to 15%, from 3% to 8%, from 2% to 10%, from 0.1 to 5%, or from 2 to 5% by weight of sulfur. The weight percent of sulfur is calculated on the basis of elemental sulfur, with any sulfur in other states converted to elemental state for the purpose of calculating the total amount of sulfur in the sorbent material.

The metal catalyst may include any metal element in any oxidation state, as elemental metal or in a chemical compound or moiety comprising the metal, which is in a form that promotes the removal in any degree of a contaminant (such as cadmium, mercury, chromium, lead, barium, beryllium, nickel, cobalt, vanadium, zinc, copper, manganese, antimony, silver, thallium, arsenic or selenium) from a fluid in contact with the sorbent material. Non-limiting examples of elemental metals include alkali metals, alkaline earth metals, transition metals, rare earth metals (including lanthanoids), and other metals such as aluminum, gallium, indium, tin, lead, thallium and bismuth.

As mentioned above, the metal catalysts can exist at any valency. For example, if iron is present, it may be present at +3, +2 or 0 valencies or as mixtures of differing valencies, and can be present as metallic iron (0), or in $FeO$, $Fe_2O_3$, $Fe_3O_8$, $FeS$, $FeCl_2$, $FeCl_3$, $FeSO_4$, and the like. As another example, if manganese is present, it may be present at +4, +2 or 0 valencies or as mixtures of differing valencies, and can be present as metallic manganese (0), or in $MnO$, $MnO_2$, $MnS$, $MnCl_2$, $MnCl_4$, $MnSO_4$, and the like.

In some embodiments of the invention, the metal catalyst is an alkali metal such as lithium, sodium, or potassium. In other embodiments, the metal catalyst is an alkaline earth metal such as magnesium, calcium, or barium. In other embodiments, the metal catalyst is a transition metal, such as palladium, platinum, silver, gold, manganese, or iron. In yet further embodiments, the metal catalyst is a rare earth metal such as cerium. In some embodiments, the metal catalyst is in elemental form. In other embodiments, the metal catalyst is present as a metal sulfide. In other embodiments, the metal catalyst is present as a transition metal sulfide or oxide. In yet other embodiments, the sorbent body comprises at least one catalyst other than an alkali metal, an alkaline earth metal, or transition metal, or other than a metal oxide. In other embodiments, the sorbent material comprises at least one catalyst other than sodium, other than potassium, other than magnesium, other than calcium, other than aluminum, other than titanium, other than zirconium, other than chromium, other than magnesium, other than iron and/or other than zinc. In other embodiments, the sorbent material comprises at least one metal catalyst other than aluminum, vanadium, iron, cobalt, nickel, copper, or zinc, either in elemental form or as sulfates.

The amount of metal catalyst present in the sorbent material may easily be determined by those skilled in the art, and may be chosen, for example, based upon the particular metal catalyst used, application for which the sorbent material is used, and the desired contaminant removing capacity and efficiency of the sorbent material. In certain embodiments, the amount of the metal catalyst may range from 1% to 25% by weight of the sorbent material, for example from 1% to 20%, from 1% to 15%, from 2% to 18%, from 3% to 10%, from 3% to 5%, from 5% to 15%, or from 5% to 10% by weight of the sorbent material.

The weight percent of metal catalyst is calculated on the basis of elemental metal, with any metal in other states converted to elemental state for the purpose of calculation of the total amount of metal catalyst in the relevant material. Metal elements present in an inert form, such as in an inorganic binder compound, are not considered metal catalysts and do not contribute to the weight percent of a metal catalyst. The amount of sulfur or metal catalyst may be determined using any appropriate analytical technique, such as mass spectroscopy and LECO analysis (e.g., for sulfur).

In exemplary embodiments comprising both a metal catalyst and sulfur in the sorbent, at least a portion of the metal catalyst may optionally be chemically bound to at least a portion of the sulfur. The term "at least a portion" in this and other contexts refers to some or all of the material being described. Thus, in those exemplary embodiments, some or all of the metal catalyst in the sorbent material may be chemically bound to some or all of the sulfur in the sorbent material. Further, in some embodiments, at least a portion of the sulfur may be chemically bound to at least a portion of carbon in the activated carbon.

When a metal catalyst is chemically bound to sulfur, in some embodiments the sorbent material comprises a metal sulfide. Exemplary metal sulfides include sulfides of manganese, copper, calcium, palladium, molybdenum, tungsten, and combinations thereof. The metal element in the metal sulfide, however, is not limited to those examples. For example, the metal element in the metal sulfides may be selected from alkali metals, alkaline earth metals, transition metals, rare earth metals (including lanthanoids), and other metals such as aluminum, gallium, indium, tin, lead, thallium and bismuth.

In certain embodiments where the sorbent material comprises a metal bound to sulfur (such as a metal sulfide), or where the sorbent material comprises sulfur bound to carbon, the sorbent material may further comprise additional sulfur, such as elemental sulfur. In various further embodiments, at least a portion of sulfur is not bound to a metal catalyst and/or at least a portion of metal catalyst is not bound to sulfur.

In various exemplary embodiments, a sulfur powder and/or catalyst precursor may be mixed with a carbon powder and then fired in an inert or reducing atmosphere. The resulting carbon powder may then be ground to achieve a desired particle size or particle size uniformity. For example, in at least one embodiment, a carbon powder is mixed with sulfur powder and a catalyst precursor, such as $MnO_2$, and fired in an inert or reducing atmosphere at temperatures of 300° C. to 900° C. The resulting carbon powder may then be ground to obtain more uniform particle size.

In various exemplary embodiments, the sorbent material may further comprise at least one binder. The binder may be a polymeric binder, such as styrene butadiene, polyvinyl chloride, polyvinyl alcohol, polyvinylpyrrolidone, polyurethane, polypropylene, polytetrafluroethylene (PTFE), epoxies, phenolic resins and other thermoplastic and thermosetting resins; and may be a dry polymer binder or a soluble binder, such as polyvinylidene fluoride (PVDF). While PVDF is soluble in organic solvents, such as N-Methylpyrrolidone (NMP), binders soluble in water may also be used. Other organic binders may include silanes and cellulosic binders, such as carboxymethyl cellulose. The binder may be inorganic sol-gel derived, such as $SiO_2$ as derived from silica sol, soluble glasses, such as sodium or potassium silicate, and variations of thereof. In further embodiments, combination of binders, including organic and inorganic binders may also be used.

In various embodiments, the sorbent material may be applied in a liquid medium or dry. The liquid medium may include, for example, water, NMP, acetone, isopropanol, methanol, ethanol, acetonitrile, tetrahydrofuran (THF), dimethoxyethane (DME), dimethyl carbonate (DMC), and propylene carbonate (PC). In some embodiments, at least one binder may be soluble in the liquid medium.

It is within the ability of one of skill in the art to prepare the liquid medium and/or dry sorbent materials for application to the substrate. For example, the activated carbon and catalysts and/or metals, when present, may be added to a liquid medium containing at least one binder in solution or suspended in the medium. As another example, for a dry application, the activated carbon and catalyst, metal, and/or binder, when present, may be intimately mixed mechanically or in another suitable fashion prior to application to the substrate.

After preparing the sorbent material, it may be applied to at least one substrate. As used herein, "substrate," and variations thereof, is intended to mean a material comprising a surface for receiving the sorbent material. The substrate may be organic, inorganic or metallic/metal material, porous or non-porous, and treated or non-treated. In various exemplary embodiments, the substrate may be metallic (such as a metal foil, e.g., aluminum foil), a metal or polymer screen, or fiber preform. Metallic and/or metal materials for use as substrates include any metal, alloy, or intermetallic compound. Non-limiting examples include steel and aluminum. Fibrous preforms for use as substrates include inorganic materials, such as fiberglass and quartz wool, organic materials, such as cellulose fiber, and, those made from any synthetic polymeric fibers, such as polyethylene and polypropylene.

In various exemplary embodiments, the thickness of the substrate may range from 10 μm to 1000 μm, for example, the thickness may range from 50 μm to 150 μm. In at least one embodiment, the thickness of the substrate may range from 1 mil to 10 mil. The choice of the substrate as well as substrate thickness may depend, for example, on the intricacy of the desired shape and the durability requirements, such as temperature, lifetime, humidity, environment, and strength, and it is within the ability of one of skill in the art to vary the substrate material and thickness in view of these and any other relevant factors for any particular embodiment.

In at least one embodiment, the at least one substrate is substantially flat prior to applying the sorbent material. As used herein, the term "substantially flat" is intended to mean that the substrate has a substantially level surface with little or no depression or elevation on a macro scale. A substantially flat substrate, as defined herein, may still, in various embodiments, be textured or rough on its surface or be porous.

In various exemplary embodiments, a surface of the at least one substrate may optionally be treated before applying the sorbent material to that surface. The substrate treatment may, in at least some embodiments, improve the bond between the sorbent material and the substrate. By way of example, the treatment may include applying a bonding layer on one or both sides of the at least one substrate. The bonding material may comprise, for example, carbon black and/or graphite, polymeric binders, and synthetic rubber (such as, for example, isoprene based rubbers, such as polyisoprene, butadiene based rubbers, such as syn-,1-4-polybutadiene, styrene based rubbers, such as styrene butadiene rubber (SBR), nitrile rubbers, such as nitrile butadiene rubber (NBR), chloroprene rubber, olefin based rubbers, such as ethylene propylene rubber, acrylic rubber, uretheane rubber, and fluorine rubbers). In various embodiments, the bonding layer may comprise a water soluble polymer and a water insoluble binder.

It is within the ability of one of skill in the art to prepare the bonding layer materials for application to the substrate. For example, in one embodiment, carbon black and graphite may be added to a solution or suspension and applied to a substrate by dip coating, gravure coating, spray coating or another acceptable method. By way of example only, in at least one embodiment, the bonding layer may be a commercial ink sold under the trade name DAG EB 012 by Acheson Chemicals of Port Huron, Mich. (comprising 2.5 to 12.5 wt. % PVP, 2.5 to 12.5 wt. % carbon black, 25 to 75 wt. % graphite, and crosslinking, metal adhesion promoter).

In another exemplary embodiment, one or both sides of the at least one substrate may be chemically and/or mechanically treated. By way of example only, one or both sides may be chemically etched or mechanically roughened, such as to form a rough surface conducive to forming a bond between the bonding layer and the substrate or sorbent coating and substrate.

In various embodiments, at least one sorbent material may be applied to at least one substrate. As used herein, the terms "apply," "applied," "applying," and variations thereof are intended to mean a method of putting sorbent material onto the at least one substrate, such as, for example, applying the sorbent material to the surface of the substrate and/or impregnating a porous substrate. In various embodiments, the sorbent material may be applied by laminating, tape-casting, spray-coating, dip-coating, slot-die coating, roll-coating or any other technique known to those of skill in the art. In various exemplary embodiments, the sorbent material may be in a liquid medium and may be deposited by a dip-coating process, a spray-coating process, or roll-coating process, for example, an inorganic fibrous substrate may be impregnated with a liquid medium comprising activated carbon particles. In another exemplary embodiment, the sorbent material may be a dry system, which may, for example, be applied to the substrate and then pressed between rollers or on a flat surface to obtain intimate contact between the substrate and the coating. In other exemplary embodiments, the sorbent material may first be formed into a film of a certain thickness and then pressed onto the substrate, i.e., lamination.

As used herein, reference to a coating on a substrate and/or a coated substrate is intended to include material applied to a substrate and/or a substrate having material applied, for example as a layer on the surface of a nonporous substrate and/or as material infused or impregnated into a porous substrate.

In various embodiments, the sorbent material may be applied to one side of the substrate. In further embodiments, the sorbent material may be applied to more than one side of the substrate. By way of example, the sorbent material may be applied to two sides of the substrate. In various embodiments, the thickness of the sorbent material coating on any one side of the substrate may be at least 10% of the thickness of the substrate, for example at least 50%, at least 100%, at least 200%, at least 300%, at least 400%, at least 500%, or at least 600% of the thickness of the substrate. As defined herein, the thickness of the sorbent material is measured from the surface of the substrate to which the sorbent material is adjacent. For example, when a substrate is impregnated with sorbent material, the thickness of the sorbent material does not include that material residing in the pores of the substrate, but rather, is measured from the surface of the substrate. It is within the ability of one of skill in the art to determine the appropriate thickness for the sorbent material coating based on, for example, whether one or two sides of the substrate are coated and the sorption capacity requirements of the system.

FIG. 1 is a SEM micrograph of a cross-section of an exemplary coated substrate according to one embodiment of the disclosure. FIG. 1 shows a substrate 101 with a sorbent material 102 applied on both sides and bonding layers 103 are interposed between the two.

In various exemplary embodiments, the substrate may be shaped after the coating is applied. As used herein with regard to the substrate, the term "shape," and variations thereof, is intended to mean subjecting the substrate to a treatment to introduce a variation in the structure of the substrate. In at least one embodiment, the coated substrate may be taken through a series of rollers to shape the substrate, such as, for example, by introducing variations, such as corrugations, or pleating, for example. In another embodiment, the coating may be applied after the substrate is shaped, and in further embodiments, the resulting shaped coated substrate may be formed to make an activated carbon-containing shaped body, for use, for example in sorbing at least one heavy metal from a fluid stream.

Figure 2:
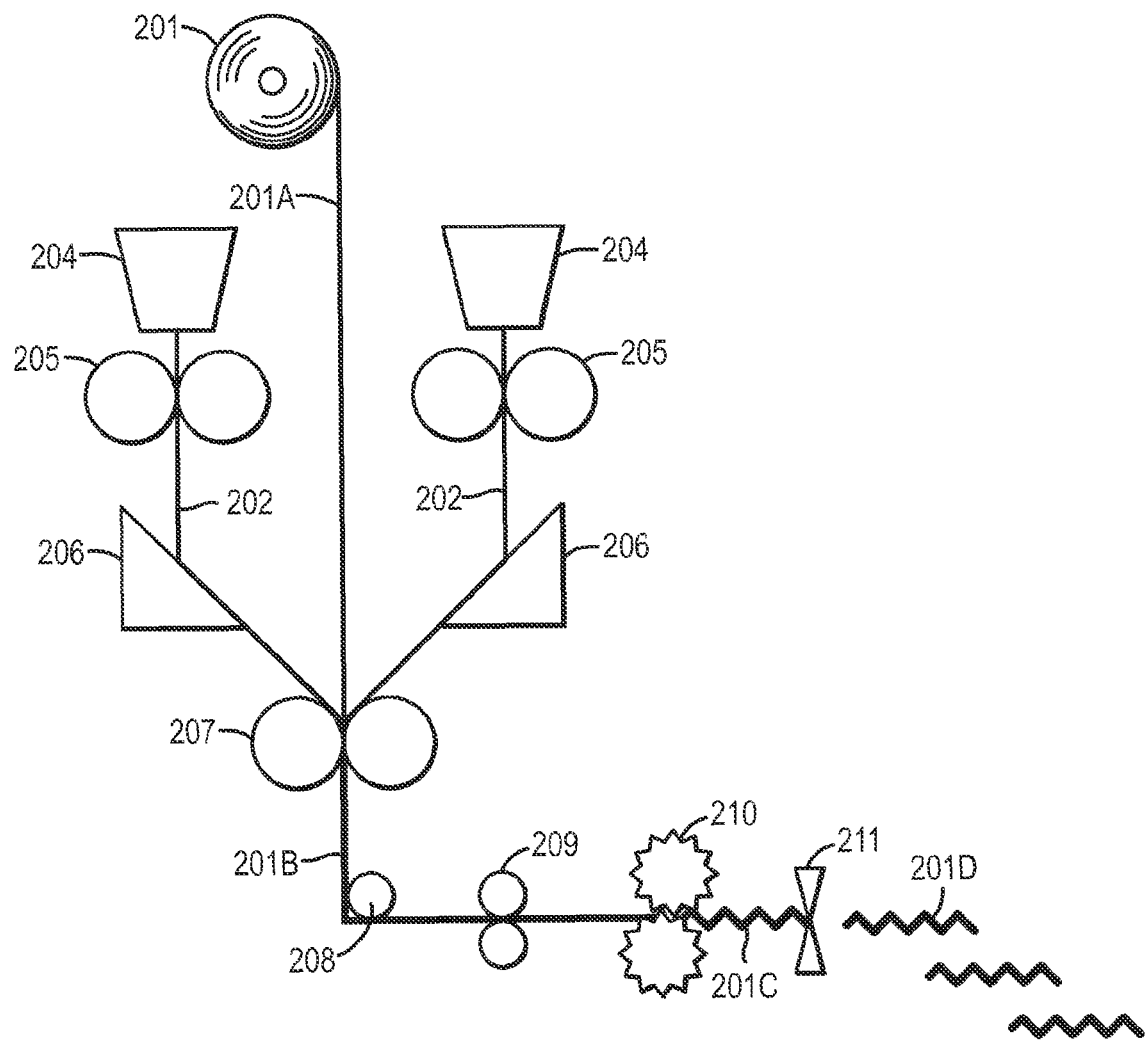
FIG. 2 is a schematic representation of an exemplary process for fabrication of a coated and shaped substrate according to one embodiment of the present invention.

FIG. 2 is a schematic representation of an exemplary process for fabrication of a coated and shaped substrate according to one embodiment of the present disclosure. In the exemplary process of FIG. 2, hoppers 204 hold sorbent material and binder in a semi-dry state. Films of sorbent material are passed through vertical calenders 205 to achieve preformed films 202 of the desired thickness. Then, angle pieces 206 deflect and guide the films 202 toward the substrate 201A, which is simultaneously drawn form a roll of substrate 201 pre-coated with a bonding layer. The preformed films 202 are applied to both sides of the substrate 201A and pass through vertical calenders 207 to obtain intimate contact between the substrate 201A and the preformed films 202. A tension roller 208 guides the coated substrate 201B to drive rollers 209, which draw out the coated substrate 201B under tension. The coated substrate 201B is then passed through impression rollers 210, thereby shaping a corrugated, double-side coated substrate 201C. Finally, the corrugated substrate 201D is cut to the desired dimensions by a cutting apparatus 211.

In various exemplary embodiments, the at least one substrate may be reinforced and/or given mechanical stability with at least one material referred to herein as "reinforcing material." Reinforcing material may be organic, inorganic or metallic/metal material, porous or non-porous, and treated or non-treated. In various exemplary embodiments, the reinforcing material may be metallic (such as a metal foil, e.g., aluminum foil), a metal or polymer screen, or fiber preform. Metallic and/or metal materials for use as reinforcing material include any metal, alloy, or intermetallic compound. Non-limiting examples include steel and aluminum. Fibrous preforms for use as reinforcing material include inorganic materials, such as fiberglass and quartz wool, organic materials, such as cellulose fiber, and, those made from any synthetic polymeric fibers, such as polyethylene and polypropylene. The reinforcing material may be shaped before or after deposition of the at least one substrate thereon, and in at least one embodiment, the reinforcing material may be free-standing.

In various exemplary embodiments, at least one reinforcing material may be used with at least one substrate comprised of inorganic and/or fibrous material. By way of example, a substrate comprised of a fiberglass sheet may be reinforced by a metal screen. In an exemplary embodiment, a fiberglass sheet impregnated with sorbent material containing a binder may be deposited onto a metal screen when wet. The binder may adhere to the screen and hold the fiberglass sheet in place and/or in a desired form.

In various embodiments, the coated substrate may be further formed after it is shaped. As used herein, the term "formed," and variations thereof, is intended to mean subjecting the coated, optionally shaped, substrate to a treatment to create a shaped body. As used herein, a "shaped body" comprises at least one coated, optionally shaped, substrate configured in any manner such that the shaped body comprises channels or passageways and/or otherwise permits the flow of a fluid stream through the body, for example, in parallel with the substrate(s). In various embodiments of the present disclosure, the shaped body may be comprised of at least one corrugated coated substrate. In further exemplary embodiments, the shaped body may be comprised of at least one corrugated coated substrate and at least one substantially flat coated substrate. The shaped body may be a honeycomb structure comprising an inlet end, an outlet end, and inner channels extending from the inlet end to the outlet end. In at least one exemplary embodiment, the honeycomb structure may be obtained by rolling or stacking the shaped coated substrate. For example, a corrugated coated substrate may be rolled (e.g., on a geared calender) or assembled with a substantially flat coated substrate to make a honeycomb structure. As another example, a coated substrate may be provided with spacers or other mechanical dividers between the substrate and another substrate in the shaped body.

Figure 3:
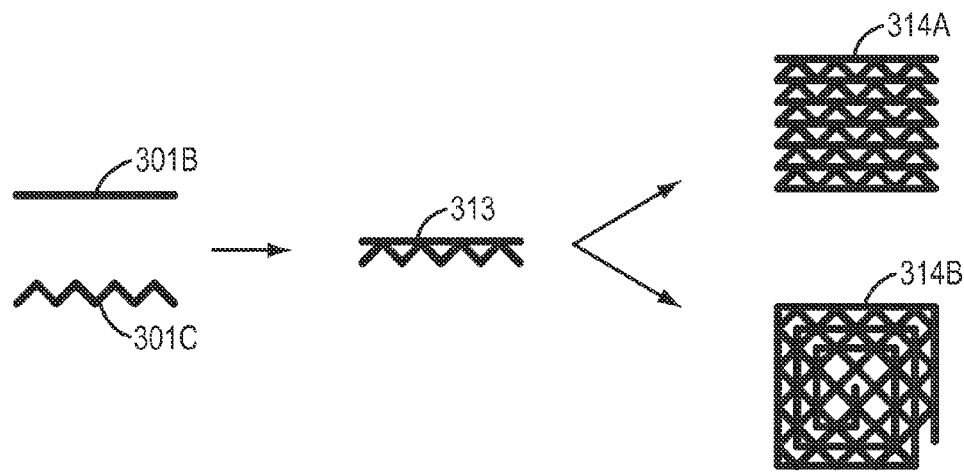
FIG. 3 is a schematic representation of an exemplary process for fabrication of an activated carbon-containing shaped body using coated and shaped substrates according to one embodiment of the present invention.

FIG. 3 is a schematic representation of an exemplary process for fabrication of an activated carbon-containing shaped body using coated and shaped substrates according to one embodiment of the present disclosure. In the exemplary process of FIG. 3, a substantially flat coated substrate 301B and a corrugated coated substrate 301C, both with double-sided coating are stacked to form a higher order base unit 313. These base units 313 can, for example, be combined or formed into a prismatic module 314A or wrapped into a roll-like module 314B. Both are examples of honeycomb shaped bodies.

In various exemplary embodiments, after forming the shaped body, the structure may be set by any method known to those of skill in the art, such as, for example by using at least one bonding material and/or at least one mechanical joining device. Non-limiting examples of bonding material include glue and epoxy. Non-limiting examples of mechanical joining devices include screws, pins, and clips. In one exemplary embodiment, one mechanical joining device, such as a screw, may be used to set the entire shaped body, e.g., a single screw may penetrate and hold all layers of a shaped body.

In various exemplary embodiments, this process of making activated carbon-containing coated substrates and/or shaped bodies may be carried out continuously in a roll-to-roll fashion and/or at a high speed to create sorbent structures of desired dimensions, including, for example, large sized honeycomb bodies. The continuous and/or high speed manufacturing that may result from the presently disclosed process may, in at least some embodiments, permit more economical fabrication of activated carbon-containing coated substrates and/or shaped bodies than methods known in the art.

Because the carbon powder is activated prior to application, potential complexities associated with activating carbon-containing bodies, particularly large-sized honeycombs, may not arise in at least some embodiments of the present disclosure. For example, in various embodiments, the activated carbon may be uniformly applied to the substrate to prepare a uniform coating and/or may not crack. Thus, the present disclosure is also directed to methods for improving the crack resistance and/or reducing the number of cracks in an activated carbon-containing body. As used herein, "uniformly coated," "uniform coating," and variations thereof are intended to mean that a substantially uniform number of carbon particles are present in a given area.

In various embodiments of the present disclosure, the substrates and shaped bodies may be used to sorb at least one contaminant from at least one fluid stream. For example, a fluid stream may be passed across a coated substrate or through the inner passageways of a shaped body, the coating on which may act as a sorbent for at least one contaminant present in the fluid stream. The fluid stream may be in the form of a gas or a liquid. The gas or liquid may also contain another phase, such as a solid particulate in the gas or liquid stream, or droplets of liquid in a gas stream. In one embodiment, the fluid stream may be a gas stream comprising coal combustion flue gases (such as from bituminous and sub-bituminous coal types or lignite coal) and syngas streams produced in a coal gasification process.

As used herein, the terms "sorb," "sorption," "sorbing," and variations thereof mean the adsorption, sorption, or other entrapment of at least one contaminant in or by a coated substrate and/or shaped body, either physically, chemically, or both physically and chemically. The term "contaminants," and variations thereof, as used herein includes heavy metals. The term "heavy metal" and any reference to a particular metal by name herein include the elemental forms as well as oxidation states of the metal.

Sorption of a heavy metal thus includes sorption of the elemental form of the metal as well as sorption of any organic or inorganic compound or composition comprising the metal. Non-limiting examples of heavy metals include cadmium, mercury, chromium, lead, barium, beryllium, nickel, cobalt, vanadium, zinc, copper, manganese, antimony, silver, thallium, arsenic, selenium, and chemical compounds or compositions comprising those elements.

In various embodiments of the present disclosure, the coated substrates and shaped bodies disclosed herein are capable of sorbing at least one heavy metal from a fluid stream. In at least one embodiment, the heavy metal is mercury.

In various exemplary embodiments, the coated substrates and/or shaped bodies may be capable of sorbing at least 5% of the at least one heavy metal in a fluid stream, for example, at least 10%, 20%, 30%, 40%, 50%, 60%, 70%, 80%, and 90% of the at least one heavy metal in a fluid stream.

Unless otherwise indicated, all numbers used in the specification and claims are to be understood as being modified in all instances by the term "about," whether or not so stated. It should also be understood that the precise numerical values used in the specification and claims form additional embodiments of the invention. Efforts have been made to ensure the accuracy of the numerical values disclosed herein. Any measured numerical value, however, can inherently contain certain errors resulting from the standard deviation found in its respective measuring technique.

As used herein the use of "the," "a," or "an" means "at least one," and should not be limited to "only one" unless explicitly indicated to the contrary. Thus, for example, the use of "the shaped body" or "a shaped body" is intended to mean at least one shaped body.

Other embodiments of the invention will be apparent to those skilled in the art from consideration of the specification and practice of the invention disclosed herein. It is intended that the specification be considered as exemplary only, with a true scope and spirit of the invention being indicated by the claims.

EXAMPLES

Example 1

A carbon powder with 7 wt % sulfur and 7 wt % MnS was mixed with PTFE polymer powder sold under the trade name Dupont™ Teflon® polytetrafluoroethylene (PTFE) 613A, (sold by DuPont Polymers of Wilmington, Del.) in a 90:10 carbon:polymer weight ratio in isopropanol medium. The powder was then dried at 100° C. and rolled through a set of rollers at room temperature to form a ribbon of sorbent material about 12 mil thick. A ribbon of the sorbent material was laminated onto each side of an aluminum sheet about 5 mil (125 μm) thick and coated with a thin bonding layer of carbon black and graphite (about 2-5 μm thick). The two ribbons of sorbent material (each 12 mils thick) completely enclosed the aluminum sheet and bonding layer, and the coated sheet was rolled through a set of steel rollers to complete the lamination process. Part of the coated sheet was rolled through a set of corrugated rollers to form corrugations in the sheet. The rolling and corrugation speed was greater than 1 mm/hr and was performed at room temperature. The corrugated sheets and other flat sheets were then stacked to form a honeycomb structure as shown in FIG. 3 above.

The assembly shows that high quality honeycomb structures may be fabricated easily and quickly via this process.

Example 2

A honeycomb structure was fabricated using the process of Example 1 and was subjected to mercury removal efficiency testing at 150° C. The sample was subjected to a commercial synthetic flue gas with 12 μg/m$^3$ concentration of mercury. The sample demonstrated 90% mercury removal efficiency over several days. Thus, the honeycomb substrate made by the process disclosed herein is effective in the removal of mercury from gaseous streams.

Example 3

In this example, a layer of quartz wool, which was used as an inorganic fiber substrate, was impregnated with a sorbent material comprising a suspension of activated carbon powder in an organic solvent. The activated carbon powder contained sulfur as well as a metal sulfide catalyst. A solution of PVDF in NMP solvent was prepared, and the activated carbon powder was mixed with the solution to obtain a 10:1 carbon to PVDF ratio. The suspension was then deposited on the quartz wool layer. The suspension infiltrates the porous layer. The impregnated substrate was then dried at 150° C. to remove the solvent. The process yielded a substrate with activated carbon particles bonded to the inorganic fibers, which reinforce the sheet structure. The structure was then shaped into a desired configuration. In an alternative embodiment, the configuration may also be formed during drying process.

Example 4

In this example, a commercial fiberglass insulation blanket was separated into a sheet of about 1/16 inch thickness. The sheet was impregnated with a sorbent material comprising an activated carbon suspension in an aqueous solution containing a binder sold under the trade name of LHB 108 P by Pred Materials International, Inc. of New York, N.Y. The carbon to the binder ratio was maintained at 10:1 in the suspension. The fiberglass layer was impregnated as described in example 3 above, and then dried and formed into the desired shape. Another sample of the impregnated fiberglass layer was reinforced with a reinforcing material comprised of shaped metal and dried to form a rigid structure.

Examples 3 and 4 demonstrate that an inorganic-material-based sheet or layer may be impregnated with binders and activated carbon, a sorbent material, to form the desired structure. While the sheets described in Examples 3 and 4 are porous, in other embodiments, non-porous sheets may be coated and shaped to form desired structures.

Example 5

A sorbent material, carbon powder with 7 wt % sulfur and 7 wt % MnS, was mixed with PTFE polymer powder sold under the trade name Dupont™ Teflon® polytetrafluoroethylene (PTFE) 613A (sold by DuPont Polymers of Wilmington, Del.) in a 90:10 carbon:polymer weight ratio in an isopropanol medium. The powder was then dried and rolled through a set of rollers to form a ribbon of about 12 mil thickness. A fiberglass mat substrate was sandwiched between two such ribbons and passed through a roller to compact the ribbons and substrate. The composite ribbon thus formed was strong and could be adjusted to a desired structure shape.

Example 6

In this experiment, a commercial fiber glass insulation blanket was separated into a sheet of about 1/16 inch thickness. The sheet was impregnated with aqueous solution containing a binder sold under the trade name of LHB 108 P by Pred Materials International, Inc. of New York, N.Y. The carbon ribbon of Example 5 above was then laminated onto this fiberglass sheet over the binder. The sheet created was strong and highly flexible with carbon particles strongly bound into the structure.

What is claimed is:

1. A method of making an activated carbon-containing coated substrate comprising:
    applying at least one sorbent material comprising activated carbon on at least one side of at least one substrate to form a coated substrate; and
    shaping the coated substrate;
    wherein the at least one sorbent material comprises elemental sulfur and a metal catalyst; and
    wherein at least a portion of the metal catalyst is chemically bound to at least a portion of the elemental sulfur and at least a portion of the elemental sulfur is not chemically bound to the metal catalyst.

2. The method of claim 1, wherein shaping the coated substrate comprises corrugating the coated substrate.

3. The method of claim 1, wherein the at least one sorbent material is applied by laminating, tape-casting, spray-coating, dip-coating, slot-die coating, or roll-coating.

4. The method of claim 1, wherein the thickness of the at least one substrate ranges from 10 μm to 1000 μm.

5. The method of claim 1, wherein the at least one sorbent material is applied on at least one side of at least one substantially flat substrate.

6. The method of claim 1, further comprising mixing the activated carbon with elemental sulfur and a metal catalyst in the presence of at least one binder to form the at least one sorbent material comprising activated carbon.

7. The method of claim 6, wherein the at least one binder is a water soluble binder, an inorganic sol-gel derived binder, or combinations thereof.

8. The method of claim 1, wherein the thickness of the sorbent material applied on at least one side of the substrate is at least 10% of the thickness of the at least one substrate.

9. The method of claim 1, further comprising treating the at least one substrate before applying the at least one sorbent material, wherein treating the at least one substrate comprises at least one of:
    (a) applying a bonding layer on the at least one substrate; and
    (b) chemically and/or mechanically treating the surface of the at least one substrate.

10. The method of claim 1, further comprising forming a shaped body from the coated substrate.

11. The method of claim 10, further comprising setting the shaped body using at least one bonding material and/or at least one mechanical joining device.

12. The method of claim 10, wherein the shaped body is a honeycomb body.

13. An activated carbon-containing body comprising at least one coated substrate, wherein:
    the at least one coated substrate is comprised of at least one sorbent material applied to at least one side of at least one substrate to form a coated substrate;
    the at least one sorbent material comprises activated carbon, elemental sulfur, and a metal catalyst; and
    at least a portion of the metal catalyst is chemically bound to at least a portion of the elemental sulfur and at least a portion of the elemental sulfur is not chemically bound to the metal catalyst.

14. The activated carbon-containing body of claim 13, wherein the activated carbon-containing body is shaped.

15. The activated carbon-containing body of claim 13, wherein the thickness of the sorbent material applied to the substrate is at least 10% of the thickness of the at least one side of at least one substrate.

16. The activated carbon-containing body of claim 13, wherein the body is a honeycomb body.

17. The activated carbon-containing body of claim 13, wherein the thickness of the at least one substrate ranges from 10 μm to 1000 μm.

18. The activated carbon-containing body of claim 13, wherein the coated substrate is corrugated or is substantially flat.

19. The activated carbon-containing body of claim 18, wherein:
    the body comprises at least two corrugate coated substrates; and
    the at least two corrugated coated substrates are stacked.

20. The activated carbon-containing body of claim 18, wherein the at least one corrugated coated substrate is rolled.

* * * * *